2,853,428
Patented Sept. 23, 1958

2,853,428

SPLIT TREATMENT SWEETENING OF CRACKED GASOLINE WITH A PHENYLENEDIAMINE AND ALKALI

Ernest M. Parkin, Long Beach, Calif., assignor to Union Oil Company of California, Los Angeles, Calif., a corporation of California No Drawing. Application February 18, 1955
Serial No. 489,293

1 Claim. (Cl. 196—29)

This invention relates to methods for sweetening light, cracked petroleum distillates. The process is a specific improvement over those procedures commonly referred to in the art as "tank sweetening" or "inhibitor sweetening," wherein a sour distillate is admixed with certain gum inhibitors such as N,N'-dialkyl p-phenylene diamines, and stored in the presence of air whereby a complicated series of reactions ensue, resulting ultimately in conversion of the mercaptans to disufides, polysulfides, and hydroxylalkyl sulfides. The inhibitor is believed to act as a catalyst in the process, although its precise function in relation to the individual reactions is not known. The presence of a caustic material is also highly beneficial, and is sometimes regarded as necessary.

The present invention differs from the conventional inhibitor sweetening processes in that, instead of employing strong caustic such as sodium hydroxide, ammonia is used. The use of ammonia greatly accelerates the sweetening of light cracked distillate boiling below about 360° F., as compared to the results obtainable with caustic soda for example. This desirable result is surprisingly not obtained when distillates boiling above about 360° F. are treated with ammonia; in such cases the sweetening rate is essentially the same as or lower than when caustic soda is employed.

In addition to accelerating the sweetening rate of light distillates, the use of ammonia also leads to certain operational advantages. Instead of providing special mixing vessels and techniques for contacting the distillate with immiscible aqueous caustic, as is necessary when caustic soda is employed, the ammonia may be utilized as a gas, and bubbled continuously or intermittently into the distillate, either before or during the sweetening period. Air is also necessary for the sweetening reaction, and is generally provided either by allowing the distillate plus inhibitor to stand in the presence of air, or by injecting air into a transfer line leading to a storage tank. In either case, ammonia gas can be mixed with the air, thereby eliminating the expense involved in providing adequate contact between, and ultimate separation of two liquid phases. It is not intended however to exclude the use of aqueous ammonia in a two-phase system. In such cases ammonia solutions of any desired strength may be employed, e. g. 1% to 20% by weight.

In some cases it is desirable to remove from about 60% to 99% of the mercaptans prior to the inhibitor sweetening stage. This is generally the case with distillates which contain more than about 0.1% of mercaptan sulfur, and would hence produce a sweetened product by inhibitor sweetening alone which would contain about the same amount of disulfide sulfur as the original mercaptan sulfur. Disulfide or polysulfide sulfur is relatively innocuous, but does tend to lower the lead susceptibility. It may therefore be desirable to remove the major part of the mercaptans by scrubbing with aqueous caustic or caustic methanol prior to the final sweetening. In such cases, the ammonia for the sweetening may be admixed with the caustic solution employed for scrubbing and, due to the considerable solubility of ammonia in hydrocarbons, sufficient ammonia will be dissolved to catalyze the subsequent inhibitor sweetening.

When liquid aqueous ammonia is used, adequate contact with the distillate may be obtained by injecting the desired amount thereof into a feed transfer line to the storage tank. Preferably, the two-phase mixture in the transfer line is passed through a mixing vessel wherein the phases are substantially emulsified and agitated for a period of about 5–30 minutes prior to being admitted to the storage tank. In the storage tank the aqueous ammonia settles to the bottom and is coninuously decanted and recycled to the mixing vessel.

In any of the above methods of employing ammonia, the amount and strength of ammoniacal reagent employed, and the degree of agitation and time of contact thereof with the feed stock, should preferably be sufficient to maintain between about 0.001% and 0.5% by weight of $NH_3$ either dissolved or evenly dispersed in the distillate during sweetening. However, other proportions may be employed if desired.

The phenylene diamine type inhibitor may be admixed with the distillate before, after or during the addition of ammonia. In most cases it is preferable to add the inhibitor before or during the addition of ammonia, but after any acid treatment to which the distillate may be subjected, inasmuch as acid washing may tend to extract the inhibitor as a soluble salt. The inhibitor may be added in pure form, or it may be dissolved in a solvent which may be identical with the feed stock, or may comprise any other suitable hydrocarbon, alcohol, ketone, etc.

Any suitable N-alkyl substituted phenylene diamine compound may be employed in accordance with the present invention. The preferred group comprises the N,N'-dialkyl p-phenylene diamines, and especially those wherein at least one of the alkyl groups is a secondary alkyl group. As an example of this preferred group, may be mentioned N,N'-disecondary-butyl-p-phenylene diamine, which is presently commercially marketed as Tenamene No. 2. Other suitable compounds include N,N'-dialkyl-p-phenylene diamines in which the alkyl groups contain from one to about 12 carbon atoms, including for example N,N'-di-isopropyl-p-phenylene diamine, N,N'-disecondary-amyl - p - phenylene diamine, N,N'-disecondary-hexyl - p - phenylene diamine, N-isopropyl-N'-secondary-butyl-p-phenylene diamine, N-isopropyl-N'-secondary-amyl-p-phenylene diamine, N-ethyl-N'-isopropyl-p-phenylene diamine, etc. The phenylene diamine compound is utilized in a concentration of less than about 1% by weight and preferably from about 0.0001% to about 0.1%.

The feed stocks treated herein may comprise any light cracked naphtha fraction having an ASTM end boiling point below about 360° F., and preferably wherein the 90% boiling point is below about 350° F. The process is generally not applicable to pure straight-run stocks, but may be employed for treating blends of straight-run and cracked stocks containing for example from about 40% to 95% by volume of cracked stock. Gasolines from petroleum, shale oils, tar sands and the like may be treated. Any other materials boiling in any range may be included with the feed stock, provided that such materials do not interfere with the sweetening of the light cracked fraction.

The process may be carried out at substantially any desired temperatures from about 50° F. to 200° F., but normal atmospheric temperatures, from about 60° F. to 100° F., are preferred in the interest of economy. At temperatures between 60° F. and 100° F., the feed stock will ordinarily become doctor-sweet within a period of about 8–96 hours' storage in the presence of oxygen, after the addition of inhibitor and ammonia.

It should be understood that the term "doctor-sweet" as employed herein means that the products do not give a precipitate of lead sulfide when treated with doctor solution, which contains sodium plumbite, caustic soda and sulfur. The doctor-sweet mercaptan sulfur level varies for different distillates, but usually is between about 0.0001% and 0.0008% by weight.

The following example may serve to illustrate the results obtainable in practice of the present invention, but should not be construed as limiting in scope:

EXAMPLE

A full-range blend of California thermal and catalytically cracked gasolines was first scrubbed with 90% sulfuric acid to remove most of the organic nitrogen bases, diolefins and other gum-forming materials, and was then fractionated to recover an overhead fraction A, having a boiling range from about 250° F. to 350° F., and a side-cut fraction B having a boiling range from about 350° F. to 400° F.

To each of two 1-liter portions (A–1 and A–2) of overhead fraction A was then added about 0.0036% by weight (10 lbs./1000 bbls.) of N,N'-di-sec-butyl-p-phenylene diamine (Tenamene No. 2), and 75 ml. of an alkaline solution. In the case of portion A–1, the alkaline solution was a 7% aqueous solution of sodium hydroxide; in the case of portion A–2, the alkaline solution was 6% aqueous ammonia. Both portions were then thoroughly agitated in the presence of air for about 20 minutes, and allowed to settle. The supernantant gasoline layers were then removed and about 1 liter of air was bubbled through each portion with agitation, insuring that each portion was saturated with air. Each aerated gasoline portion was then stored in a stoppered flask for about 3 days, and was analyzed periodically for mercaptan sulfur content.

Two 1-liter portions (B–1 and B–2) of side-cut fraction B were simultaneously treated in a manner identical to portions A–1 and A–2. The periodic mercaptan sulfur analyses of all portions were as follows:

Table 1

| Fraction | Overhead Fraction A | | Side-cut fraction B | |
|---|---|---|---|---|
| | A–1 | A–2 | B–1 | B–2 |
| Alkali used | NaOH | NH₄OH | NaOH | NH₄OH |
| Mercaptan S, wt. percent: | | | | |
| initial | 0.004 | 0.004 | 0.0015 | 0.0015 |
| after 5 hours | 0.0033 | | 0.0013 | |
| after 12 hours | | 0.0021 | | 0.0014 |
| after 17 hours | 0.0029 | | 0.0011 | |
| after 30 hours | 0.0025 | | 0.0011 | |
| after 36 hours | | 0.0008 | | 0.0012 |
| after 48 hours | 0.0025 | 0.0007 | 0.0009 | 0.0011 |
| after 65 hours | 0.0023 | | 0.0005 | |

The above data for treatment of overhead fraction A demonstrate the marked superiority of ammonia over sodium hydroxide for the sweetening of light distillates. The treatment with NaOH failed to produce a sweet product even after 65 hours, and the rate of mercaptan conversion after about 30 hours indicates that little if any further sweetening would be obtained. On the other hand, in the case of the ammonia treated portion, the product is substantially doctor-sweet after 36–48 hours.

In the case of the high-boiling fraction B, it will be noted that there is little apparent difference in the effectiveness of ammonia and caustic soda, with a slight preference for the latter. It is clear therefore that in the treatment of light cracked distillates, ammonia is definitely and unexpectedly superior to sodium hydroxide. Whether this phenomenon is attributable to solubility differences, differences in the types of mercaptans present, the possible presence of interfering organic nitrogen bases in the high-boiling fraction, or to other causes, is not known, and hence the results must be regarded as empirical.

Substantially the same differential results are obtained when other cracked mineral oil distillates are treated, and when other inhibitors and sweetening procedures are employed. The invention should therefore not be construed as limited to the details of the example, but is intended to be embraced broadly by the following claim.

I claim:

A method for sweetening a full-range cracked gasoline containing hydrocarbons boiling above about 360° F. and below about 350° F., which comprises fractionating said gasoline at a cut-point between about 350° F. and 360° F. to recover a high-boiling fraction and a low-boiling fraction, sweetening said high-boiling fraction by storing in the presence of dissolved oxygen, an alkali metal hydroxide, and a small proportion of an N,N'-dialkyl-p-phenylene diamine, sweetening said low-boiling fraction by storing in the presence of dissolved oxygen, ammonia and a small proportion of an N,N'-dialkyl-p-phenylene diamine, and remixing the separately sweetened fractions.

References Cited in the file of this patent
UNITED STATES PATENTS

| | | |
|---|---|---|
| 1,827,537 | Morrell | Oct. 13, 1931 |
| 2,090,007 | MacKenzie et al. | Aug. 17, 1937 |
| 2,616,833 | Chenicek et al. | Nov. 4, 1952 |
| 2,616,839 | Rosenwald | Nov. 4, 1952 |
| 2,671,048 | Rosenwald | Mar. 2, 1954 |
| 2,729,592 | Niehaus | Jan. 3, 1956 |